United States Patent
Ravikanth et al.

(10) Patent No.: US 6,331,978 B1
(45) Date of Patent: Dec. 18, 2001

(54) GENERIC LABEL ENCAPSULATION PROTOCOL FOR CARRYING LABEL SWITCHED PACKETS OVER SERIAL LINKS

(75) Inventors: Rayadurgam Ravikanth, Burlington, MA (US); Ove Strandberg, Cupertino, CA (US); Pasi Vaananen, Sommerville, MA (US)

(73) Assignee: Nokia Telecommunications, Oy, Espoo (FI)

( * ) Notice: Subject to any disclaimer, the term of this patent is extended or adjusted under 35 U.S.C. 154(b) by 0 days.

(21) Appl. No.: 09/264,758

(22) Filed: Mar. 9, 1999

(51) Int. Cl.[7] ............................ H04L 12/56; G06F 15/16
(52) U.S. Cl. ........................ 370/392; 370/401; 370/474; 714/776; 714/781; 714/819
(58) Field of Search ................................ 370/392, 401, 370/449, 467, 474, 216, 229, 230, 231, 242, 244, 389, 412, 413, 414, 465, 471; 714/746, 752, 758, 759, 774, 776, 781, 785, 819

(56) References Cited

U.S. PATENT DOCUMENTS

| | | | |
|---|---|---|---|
| 4,763,319 | * | 8/1988 | Rozenblit ............................ 370/397 |
| 4,995,032 | * | 2/1991 | Demichelis et al. .................... 370/60 |
| 5,099,517 | | 3/1992 | Gupta et al. ............................ 380/29 |
| 5,136,592 | * | 8/1992 | Weng .................................. 371/39.1 |
| 5,430,715 | | 7/1995 | Corbalis et al. ........................ 370/54 |
| 5,490,252 | * | 2/1996 | Macera et al. ......................... 709/249 |
| 5,502,726 | * | 3/1996 | Fischer ................................ 370/392 |
| 5,524,116 | * | 6/1996 | Kalmanek, Jr. et al. ............. 370/389 |
| 5,546,387 | * | 8/1996 | Larsson et al. .......................... 370/60 |
| 5,594,732 | * | 1/1997 | Bell et al. ............................. 370/401 |
| 5,655,140 | * | 8/1997 | Haddock ............................... 709/246 |
| 5,699,369 | * | 12/1997 | Guha ........................................ 371/41 |
| 5,717,689 | * | 2/1998 | Ayanoglu ............................. 370/349 |
| 5,765,032 | * | 6/1998 | Valizadeh ............................. 709/235 |
| 5,841,776 | | 11/1998 | Chen .................................... 370/441 |
| 5,878,044 | | 3/1999 | Frischknecht et al. .............. 370/466 |

(List continued on next page.)

FOREIGN PATENT DOCUMENTS

1009129 A2 * 6/2000 (EP) .

OTHER PUBLICATIONS

Data Communications, Computer Networks and Open Systems, Halsall, 4th Ed., pp. 130–131, 1995.*

Primary Examiner—Alpus H. Hsu
(74) Attorney, Agent, or Firm—Altera Law Group, LLC (57) ABSTRACT

A method for encapsulation of labeled datagrams over serial communications links, and a method for extracting the datagrams on the receiving end of the link. The encapsulation method includes adding a label and a label error correction to the front of a datagram, the label error correction being derived using the label and adding a cyclic redundancy check at a trailing end of the datagram, the cyclic redundancy check being derived using the datagram. The end of a packet encapsulating the datagram with a label, a label error correction field and a cyclic redundancy check field is identified by analyzing incoming bits for a packet until a pattern of bits is detected that matches a number of previous bits of the packet coded with a predetermined coding formula and identifying the end of the packet based upon the detection of the match and the predetermined coding formula. The end of the current frame may be identified by coding incoming bits according to the cyclic redundancy check polynomial to produce a calculated cyclic redundancy check until the calculated cyclic redundancy check matches the cyclic redundancy check field. In addition, or alternatively, the end of the previous frame may be identified by coding incoming bits according to the label error correction polynomial to produce a calculated label error correction until the label error correction matches the label error correction field.

33 Claims, 4 Drawing Sheets

U.S. PATENT DOCUMENTS

| | | | |
|---|---|---|---|
| 5,878,045 | 3/1999 | Timbs | 370/466 |
| 5,892,924 * | 4/1999 | Lyon et al. | 395/200.75 |
| 5,917,828 * | 6/1999 | Thompson | 370/474 |
| 5,920,705 * | 7/1999 | Lyon et al. | 395/200.7 |
| 5,936,949 * | 8/1999 | Pasternak et al. | 370/328 |
| 5,954,835 * | 9/1999 | Hihhinson et al. | 714/759 |
| 5,995,995 * | 11/1999 | Thomas et al. | 709/100 |
| 6,038,233 * | 3/2000 | Hamamoto et al. | 370/401 |
| 6,118,784 * | 9/2000 | Tsuchiya et al. | 370/401 |
| 6,122,759 * | 9/2000 | Ayanoglu et al. | 714/57 |

* cited by examiner

GENERIC LABEL ENCAPSULATION PROTOCOL FOR CARRYING LABEL SWITCHED PACKETS OVER SERIAL LINKS

BACKGROUND OF THE INVENTION

1. Field of the Invention

This invention relates in general to serial communications systems, and more particularly to a generic label encapsulation protocol for carrying label switched packets over serial links.

2. Description of Related Art

Demand for bandwidth is skyrocketing in data service provider networks. With this demand comes a need for efficient bandwidth utilization, higher performance and simplicity. Fullest traffic an Internet Protocol (IP) traffic volumes are expected to continue to increase at substantially higher rates. With the rise of IP throughout global networks, many high volume links are trying to sidestep the additional burden required by ATM cells. Most carriers use SONET (Synchronous Optical Network) as the OSI layer I specification for data transmission over optical fibers in the public network, and ATM is then used as the OSI layer II link. However, the extra data that must be added to a packet to traverse an ATM link can eat up more than 10 percent of ATM's raw bandwidth. Further, there are many other packet protocols for bundling data for transmission. While SONET will be mentioned herein as a primary example, those skilled in the art will recognize that the concepts discussed here are valid for any serial link.

SONET is a family of transmission rates from 51.84 Mbps (the base rate) to 13.22 Gbps that was created to provide the flexibility needed to transport many digital signals with different capacities, and to provide a design standard for manufacturers. Despite the name, it is not limited to optical links. SONET development began as a suggestion to the Exchange Carriers Standards Association and ultimately came to rest at the American National Standards Institute (ANSI). SONET has also been adopted by the International Telecommunications Union—Telecommunications Standardization Sector (ITU-T). The ITU-T version is know as Synchronous Digital Hierarchy (SDH), which varies slightly in that SDH levels begin at 155 Mbps.

To deliver efficient network manageability and scalability, today's data networks are based on a hierarchical architecture that includes the backbone as well as the service node layers. The major function of a router and a backbone is to provide performance and scalability, to switch millions of packets per second, and to scale to high rates. At the service nodes or the distribution layer, the main goal of an edge router is to provide features such as security access control, and support for differentiated services through class of service (CoS) offering. For example, most carriers transport their router traffic through the SONET/SDH platforms for long distances. The SONET/SDH hardware forms the main infrastructure amending telecommunication providers and enterprises worldwide. Therefore, it is imperative for the data equipment to inter operate with this infrastructure seemlessly.

IP over SONET/SDH is gaining popularity as a way to reduce the ATM overhead burden described above and squeeze more bandwidth out of a link. IP over SONET/SDH removes ATM from the transmission picture, foregoing the traditional method of encapsulating IP packets into an ATM cell, which is then mapped into a SONET frame. Instead, this technology maps the IP package straight into a SONET frame.

Packet data over SONET/SDH is the servo transmission of data over SONET frames through the use of point-to-point protocol (PPP). PPP was designed as a standard method of communicating over point-to-point links. Initial deployment was designed for short local lines, lease lines and plain-old-telephone-service (POTS) using modems. As new packet services and higher speed lines are introduced, point-to-point protocol is easily deployed in these environments as well.

PPP treats SONET transports as octet oriented synchronous links. PPP presents an octet interface to the physical layer and there is no provision for sub-octets to be supplied or accepted. The octet stream is mapped into the SONET synchronous payload envelope (SPE), with the octet boundaries aligned with the SPE octet boundaries. SONET provides substantial overhead information, allowing simpler multiplexing and greatly expended operations, administration, maintenance and provisioning (OAM&P) capabilities.

SONET includes multiplexing principles such as mapping, aligning, multiplexing and stuffing. One of the benefits of SONET is that it can carry large payloads (above 50 Mbps). Nevertheless, the digital hierarchy signals can be accommodated as well by subdividing STS (Synchronous Transport Signals) SPE into smaller components of structures known as virtual tributaries (VTs), for the purpose of transporting and switching payloads smaller than the STS-1 rate.

Accordingly, packet over SONET/SDH is an ideal feature for networks that are built for providing Internet or IP data. Packet over SONET/SDH provides superior bandwidth utilization and efficiency over other transport methods. However, not all networks can reap the benefits of IP over SONET/SDH. First, all data traversing the link must be IP. Because 155 Mbps over IP data is not easy to come by, this requirement is a major drawback of using IP over SONET/SDH. ATM can be more easily statistically multiplexed than IP over SONET/SDH. However, ATM can be run on lower speed links. But, as mentioned above, ATM carries the additional overhead that must be added to each packet to traverse the ATM link.

As the convergence occurs towards delivery of audio, data, images and video through diverse transmission switching systems that supply high speed transportation over any medium to any location, SONET is gaining momentum as the transport network for transmitting packets due to its reduced overhead compared to IP over ATM-type solutions. However, as stated above, the current approach is directed to packet over SONET/SDH using point-to-point protocol encapsulation.

There is an ongoing effort in the IETF to provide easy switching for packet traffic over servo links by using labels and label switching routers (LSR). The multi-protocol label switching (MPLS) groups work is directed at solving the complexity involved in label-switching and presenting a standard-based interoperability testing proposal. Label switching adds connections to connectionless protocols such as Transport Control Protocol/Internet Protocol (TCP/IP). By calculating routes across the network and assigning "tags" or "labels" to those routes, frame forwarding is simplified to the point where it also can be implemented in hardware. Given this architecture, labels switching can, in theory, operate equally well over ATM and non-ATM environments. In ATM networks, the label already exists; it is the virtual channel (VC) address. In non-ATM environments, such as Ethernet, new protocols have to be developed to accomplish this. The main advantage of using labels is improved forwarding capability to elimination of layer three look-up and the traffic engineering capabilities brought by the use of labels.

However, as mentioned above, the only approach currently used for carrying packet traffic over SONET/SDH uses point-to-point encapsulation. A definition as to how labels can be encapsulated has not yet been proposed. Further, even if labels are used for carrying packet traffic over servo links, the problem of detecting the end of packet without having to look inside the payload has now been solved.

It can be seen then that there is a need for encapsulation for carrying label switch packet over servo links.

It can be seen then that there is a need for a method to detect the end of packets without having to look inside the payload.

SUMMARY OF THE INVENTION

To overcome the limitations in the prior art described above, and to overcome other limitations that will become apparent upon reading and understanding the present specification, the present invention discloses a generic label encapsulation protocol for carrying label switched packets over serial links.

The present invention solves the above-described problems by providing a label encapsulation protocol and a method for detecting the end of variable length packets.

A method in accordance with the principles of the present invention includes adding a label and a label error correction to the front of a datagram, the label error correction being derived using the label and adding a cyclic redundancy check at a trailing end of the datagram, the cyclic redundancy check being derived using the datagram.

Other embodiments of a method in accordance with the principles of the invention may include alternative or optional additional aspects. One such aspect of the present invention is that the label includes three bytes.

Another aspect of the present invention is that the label error correction is obtained according to $D^8+D^2+D+1$.

Another aspect of the present invention is that the datagram is scrambled.

Another aspect of the present invention is that the datagram is scrambled according to $D^{43}+1$.

Another aspect of the present invention is that the cyclic redundancy check is obtained using a polynomial $D^{16}+D^{15}+D^2+1$.

Another aspect of the present invention is that the datagram is an IPv4 packet.

Another aspect of the present invention is that the datagram is an IPv6 packet.

Another aspect of the present invention is that the label comprises a plurality of bits, wherein a bit in the label is a label significant bit for indicating that no payload is being carried.

In another embodiment of the present invention a method is provided for identifying an end of a packet encapsulating the datagram with a label, a label error correction field and a cyclic redundancy check field, the method including analyzing incoming bits for a packet until a pattern of bits is detected that matches a number of previous bits of the packet coded with a predetermined coding formula and identifying the end of the packet based upon the detection of the match and the predetermined coding formula.

Another aspect of the present invention is that the predetermined coding formula comprises a cyclic redundancy check polynomial and the analyzing comprises coding incoming bits according to the cyclic redundancy check polynomial to produce a calculated cyclic redundancy check until the calculated cyclic redundancy check matches the cyclic redundancy check field.

Another aspect of the present invention is that the selecting further comprises the identifying the end of the current packet based upon the detection of the match.

Another aspect of the present invention is that the predetermined coding formula comprises a label error correction polynomial and the analyzing comprises coding incoming bits according to the label error correction polynomial to produce a calculated label error correction until the label error correction matches the label error correction field.

Another aspect of the present invention is that the selecting further comprises the identifying the end of the previous packet based upon the detection of the match.

Another aspect of the present invention is that the predetermined coding formula comprises a combination of a cyclic redundancy check polynomial and a label error correction polynomial, wherein the analyzing comprises coding incoming bits according to the cyclic redundancy check polynomial and the label error correction polynomial, wherein the cyclic redundancy check polynomial produces a calculated cyclic redundancy check until the calculated cyclic redundancy check matches the cyclic redundancy check field and the label error correction polynomial produces a calculated label error correction until the label error correction matches the label error correction field.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Figure 1:
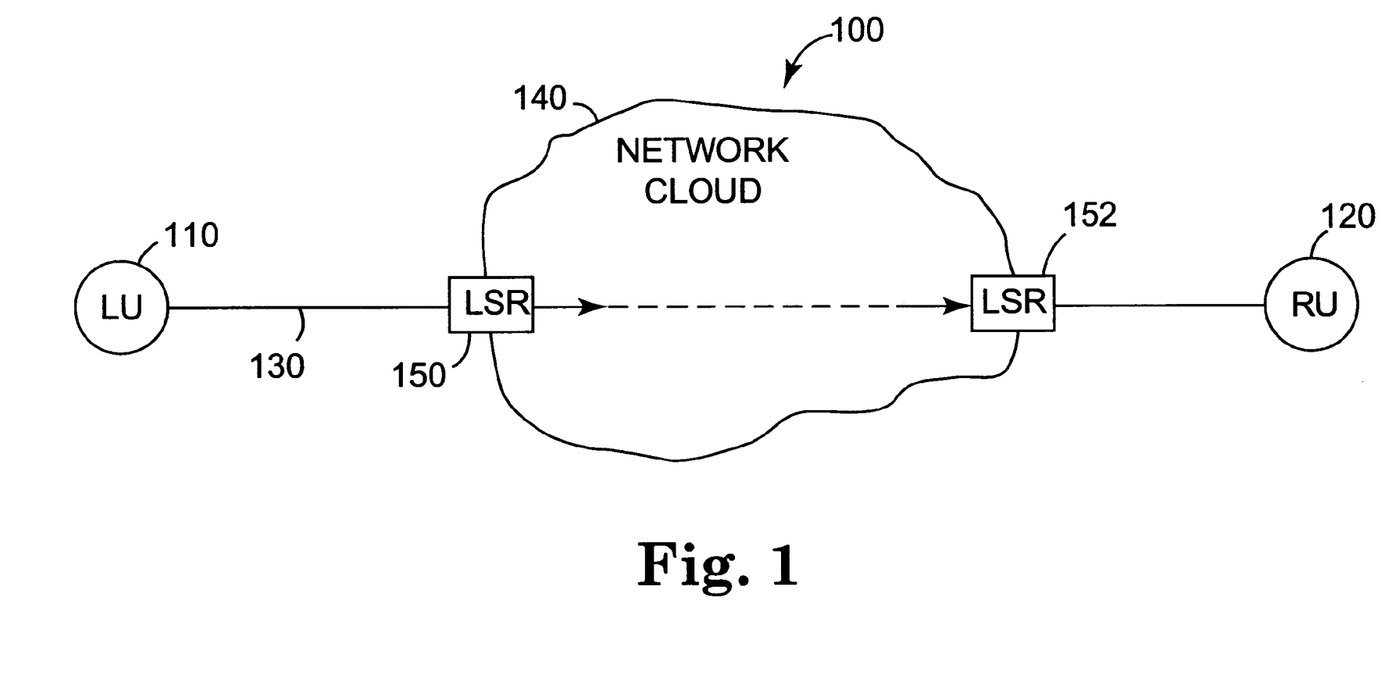
FIG. 1 illustrates a network system that is applicable to the generic label encapsulation protocol according to the present invention for carrying label switched packets over serial links.

FIG. 1 illustrates a network system 100 that is applicable to the generic label encapsulation protocol according to the present invention for carrying label switched packets over serial links. In FIG. 1, a local user 110 is sending packets to a remote user 120 via a serial link 130. The packets cross the network 140 via routers 150, 152 at each end thereof. For example, the packets may be transported over SONET/SDH. Packet over SONET/SDH has been gaining momentum, due to its reduced overhead as compared to IP over ATM type solutions. Label switching in IP networks has up to now dealt with link layer technologies such as ATM and Frame Relay. However, ATM and Frame Relay have more natural ways to map label switched traffic to the link layer technologies than packet over SONET/SDH. The current approach to packet over SONET/SDH uses PPP encapsulation for this purpose. However, the manner in which labels can be encapsulated in packet over SONET/SDH has not yet been defined.

The present invention provides a generic label encapsulation protocol that enables the carrying of a label and the associated packet in a fashion that will enable easy switching by a label switching router (LSR) 150, 152. Further, the present invention provides a method for extracting the datagram from the label at the remote end.

Figure 2:
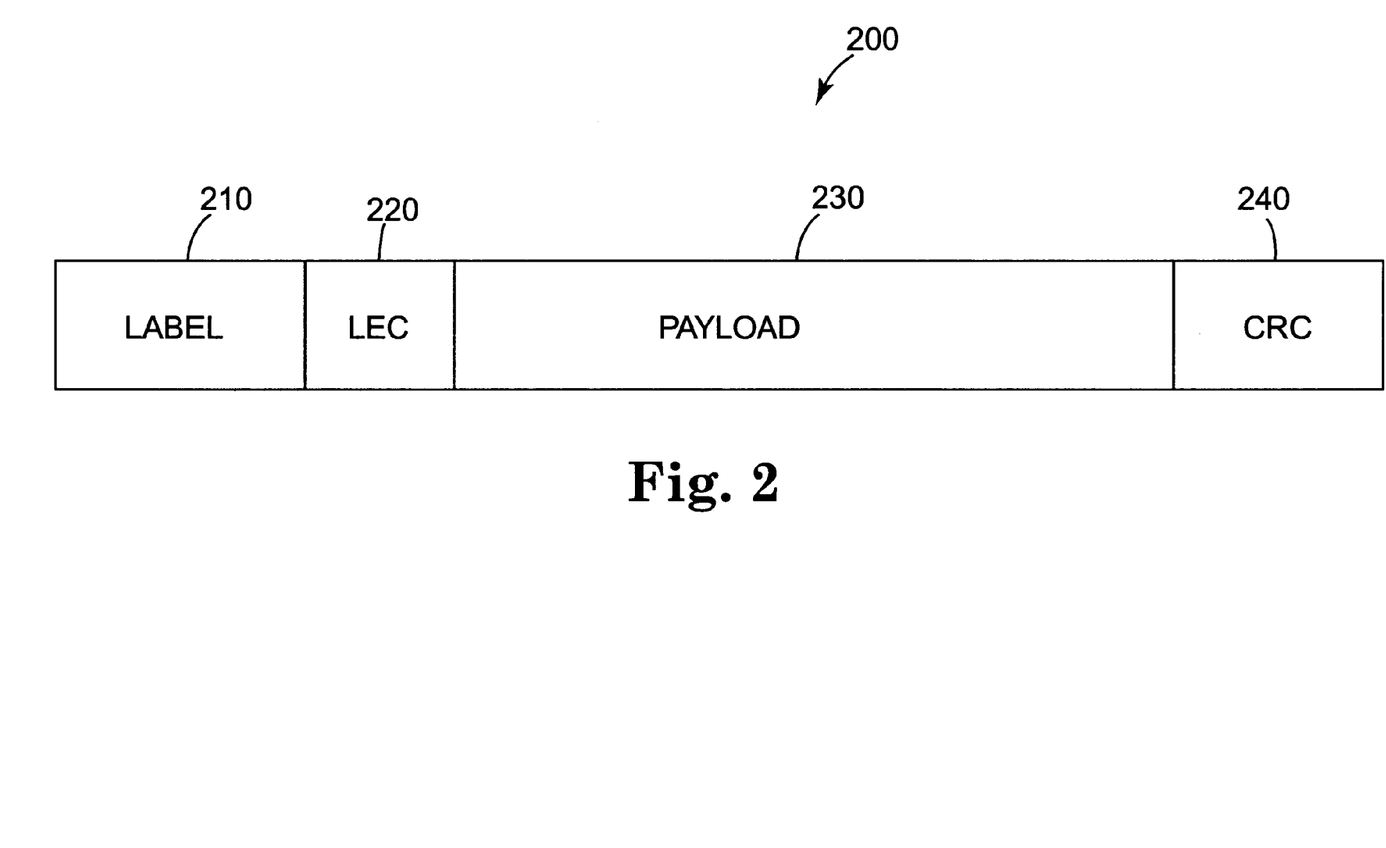
FIG. 2 illustrates a generic label encapsulation protocol (GLEP) packet according to the present invention.

FIG. 2 illustrates a generic label encapsulation protocol (GLEP) packet 200 according to the present invention. As shown in FIG. 2, 24 bits or 3 bytes are allocated for the label 210 information. Since this is the primary header that the label switching will be based upon, a 1 byte Label Error Correction (LEC) field 220 is used to detect errors in the label header of this GLEP packet 200. For example, the LEC field 220 may be obtained using the polynomial $D^8+D^2+D+1$. The GLEP packet 200 also includes the original payload 230 and a Cyclic Redundancy Check (CRC) field 240.

Figure 3:
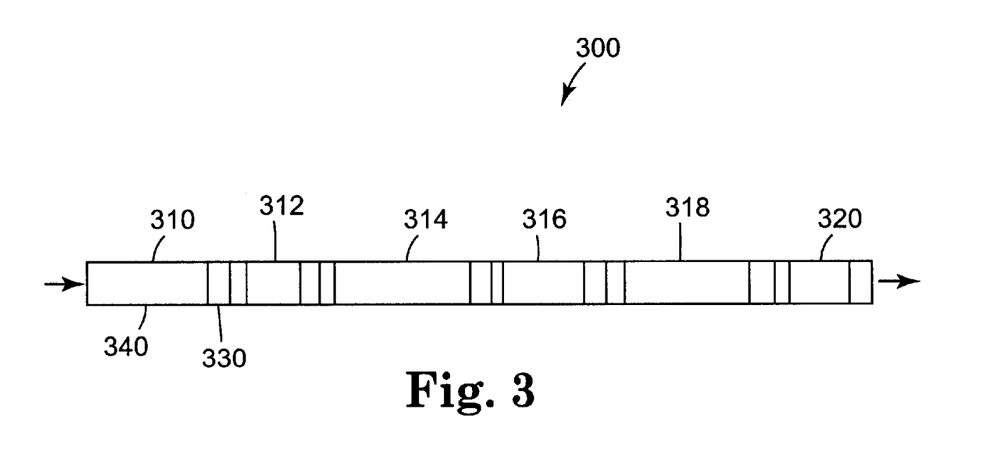
FIG. 3 illustrates a stream 300 of variable size packets.

The original payload is a variable size packet. FIG. 3 illustrates a stream 300 of variable size packets 310–320. Each of the variable size packets 310–320 includes a header 330 and a data field 340. For example, the variable size packets 310–320 may be IPv4 or IPv6 packets or they may be based on any other network layer protocol.

Referring again to FIG. 2, the payload 230 is the field adjacent to the LEC field 220. The payload 230 may be scrambled, e.g., using the $D^{43}+1$ polynomial which is the ATM scrambler. Those skilled in the art will recognize that the generic label encapsulation protocol according to the present invention is truly multi-protocol in the fact that the payload 230 being carried could be any network layer protocol. This ensures that the generic label encapsulation protocol according to the present invention is consistent with the work of the MPLS working group. The fourth and final field in the proposed scheme is the CRC field 240. The CRC 240 may be 2 bytes in length. Further, the CRC 240 may be obtained using the CRC-16 polynomial $D^{16}+D^{15}+D^2+1$.

However, those skilled in the art will recognize that the present invention is not meant to be limited to the above-described label space partitioning, field dimensions and coding polynomials. Those skilled in the art will also recognize that in addition to the MPLS label identifier, fields like MAC bits, Class of Service bits, congestion indication bits, etc. may be included, and that in such a case, the label field 210 indicated above could be more than 3 bytes. In addition, one of the bits of the label field 210 may be reserved for a "label significant bit." This is to indicate the fact that no payload 230 is being carried. Actually there are three options for this:

1. When there is no data to send, this bit is set as "label insignificant", and consecutive labels marked with "label insignificant" are sent as long as there is no data to send.
2. It may even be unnecessary to have bit for this, these can be discarded on basis of the reception of consecutive matching labels back-to-back.
3. Other alternative is to reserve special label codepoint such as 00000000 00000000 xxxxxxx for this function (bits are expensive).

Having described the encapsulation protocol, the method for extracting the payload from the label will be described next. The extraction needs to be examined as to whether the present invention can effectively be used to label switch GLEP packets 200, without too much processing (such as IP level processing) overhead.

One of the primary advantages to the ATM approach is the fact that the ATM cells are of fixed sizes and the virtual path indicator/virtual channel indicator (VPI/VCI) fields are in fixed positions in the cell. While even in the current GLEP case, it is true that the labels 210 are placed in a fixed location and only a fixed length lookup is required, it still remains a problem that the GLEP packets 200 are variable size in nature since the datagrams 230 themselves are of variable length as shown in FIG. 3. The task then is to detect the end of packet without having to look inside the payload. This can be achieved using the CRC field 240 and the LEC field 220.

Figure 4:
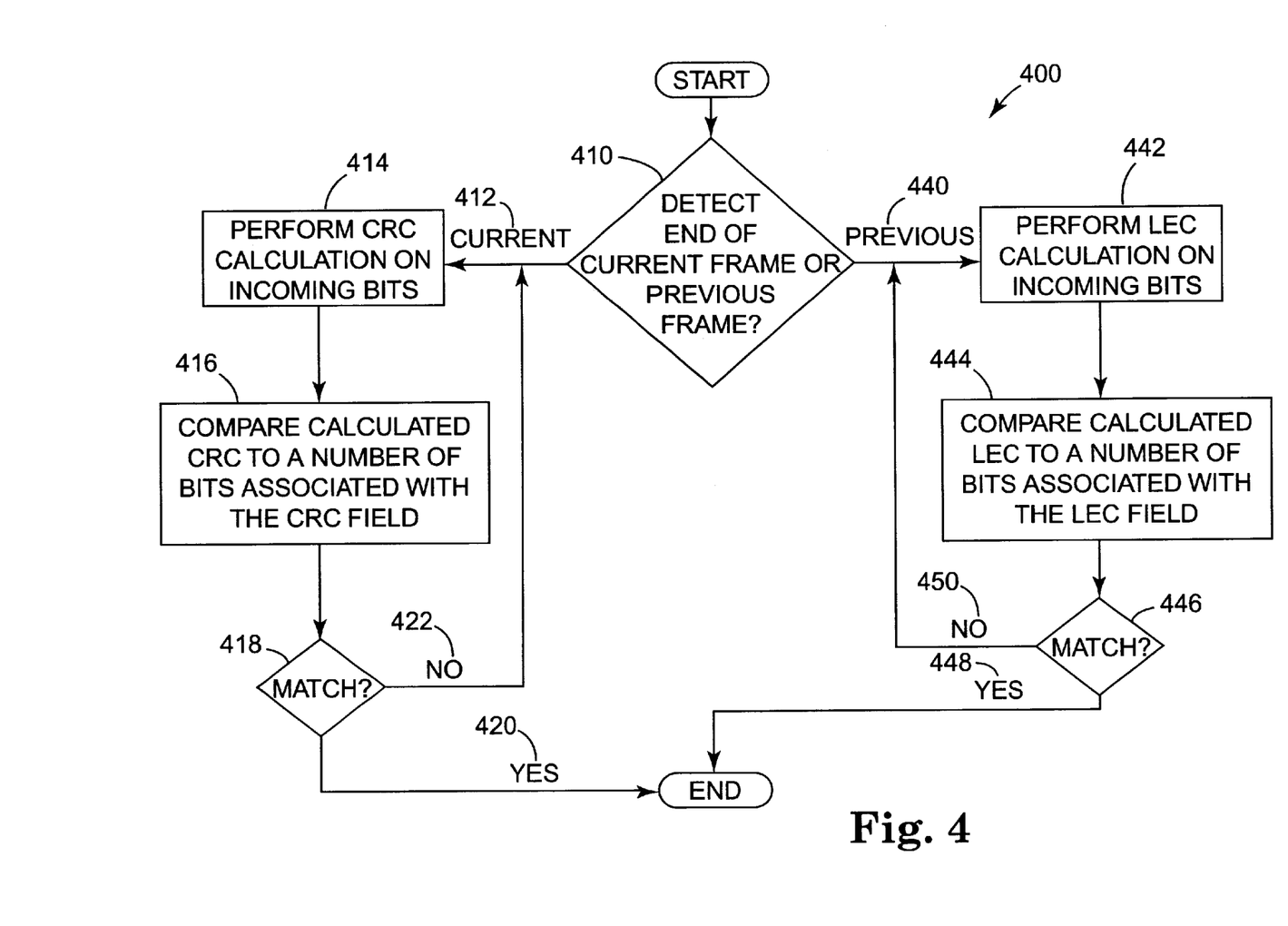
FIG. 4 is a flow chart illustrating the method for detecting the end of a variable size packets having a label encapsulated according to the present invention.

FIG. 4 is a flow chart 400 illustrating a method for detecting the end of a variable size packet having a label encapsulated according to the present invention. In FIG. 4, the end of a frame may be identified in two ways. The end of a previous frame may be identified by detecting the beginning of the label of the current frame using the LEC, or the end of the current frame may be detected by using the CRC. First, the method is chosen 410. If the end the current frame method is chosen 412, the CRC for the bits of the payload is calculated 414. The typical implementation of the CRC is in the form of shift registers. In keeping with the example described above with reference to FIG. 2, as the bits of the payload come in, the 16-bit CRC operation is performed in hardware. This calculated CRC is then checked with the trailing 16 bits 416. Monitoring for a match takes place 418, wherein a match indicates the end of the current GLEP frame 420. Otherwise, the process recycles 422.

If the end the previous frame method is chosen 440, the LEC for the bits of the label is calculated 442. As the bits of the label come in, the LEC operation is performed in hardware. This calculated LEC is then checked until a match with the LEC field is identified 444. Monitoring for a match takes place 446, wherein a match indicates the beginning of the current frame and consequently the end of the previous GLEP frame 448. Otherwise, the process recycles 450.

Thus, it is possible to accurately identify the variable length GLEP frame. The allows the forwarding of a GLEP frame based on the label that is carried in the header, which is a fixed length lookup. Thus, this generic label encapsulation protocol according to the present invention allows for easy deployment of MPLS over serial links such as SONET. Nevertheless, those skilled in the art will readily recognize that the present invention is not meant to be limited to separately using CRC and LEC. Those skilled in the art will recognize that more complex methods in accordance with the present invention may be used to increase performance. For example, a combination of the two approaches, i.e., some combination using both LEC and CRC, may be used to detect the end of the GLEP packets.

Returning again to FIG. 1, according to the present invention, a packet entering the network cloud 140 would have a label attached at the ingress LSR 150. The egress LSR 152 would then extract the label according to the method described above with reference to FIG. 4.

In summary, the present invention describes a new method for encapsulation of labeled datagrams over serial communications links, and a method for extracting the datagrams on the receiving end of the link. The key advantage of the present invention over the currently available label encapsulation methods, such as ATM and Frame Relay is the simplicity and efficiency of the method over the other alternatives. While SONET and MPLS are key technologies in Internetworking, there are benefits to combining these two. The approach outlined herein represents the first effort in carrying MPLS packets in SONET. This eliminates the additional overhead of running ATM on SONET, while still maintaining the MPLS switching capability. Further, all the associated benefits of MPLS can be obtained. Since packet over SONET is already in use, the present invention further enhances the capabilities of such a network. Specifically, QoS can be enabled on IP over SONET backbones through the use of MPLS. While SONET has been mentioned as the primary example above, those skilled in the art will recognize that the present invention described herein is valid for any serial link, and thus enables MPLS over any serial link.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for encapsulating a label in a packet enabling label switching of the packet over serial links, comprising:
   adding a multi-protocol label and a multi-protocol label error correction to the front of a datagram, the label error correction being delivered using the label and the multi-protocol label error correction enabling identification of the end of the packet; and
   adding a cyclic redundancy check at a trailing end of the datagram, the cyclic redundancy check being derived using the datagram.

2. The method of claim 1 wherein the label includes three bytes.

3. The method of 1 wherein the label error correction is obtained according to $D^8+D^2+D+1$.

4. The method of claim 1 wherein the datagram is scrambled.

5. The method of claim 4 wherein the datagram is scrambled according to $D^{43}+1$.

6. The method of claim 1 wherein the cyclic redundancy check is obtained using a polynomial $D^{16}+D^{15}+D^2+1$.

7. The method of claim 1 wherein the datagram is an IPv4 packet.

8. The method of claim 1 wherein the datagram is an IPv6 packet.

9. The method of claim 1 wherein the label comprises a plurality of bits, wherein a bit in the label is a label significant bit for indicating that no payload is being carried.

10. The method of claim 1, wherein the multi-protocol label includes address information and non-address information.

11. A method for identifying an end of a packet encapsulating the datagram with a label, a label error correction field and a cyclic redundancy check field, comprising:
   analyzing incoming bits of the encapsulating packet until a pattern of bits is detected that matches a number of previous bits of the packet encoded with a predetermined coding formula that includes a label error correction polynomial, wherein analyzing includes coding incoming bits according to the label error correction polynomial to produce a calculated label error correction until the label error correction matches the label error correction field; and
   identifying the end of the packet based upon the detection of the match and the predetermined coding formula.

12. The method of claim 11 wherein the predetermined coding formula further comprises a cyclic redundancy check polynomial and the analyzing further comprises coding incoming bits according to the cyclic redundancy check polynomial to produce a calculated cyclic redundancy check until the calculated cyclic redundancy check matches the cyclic redundancy check field.

13. The method of claim 12 wherein the identifying further comprises identifying the end of the current packet based upon the detection of the match.

14. The method of claim 11 wherein the identifying further comprises identifying the end of the previous packet based upon the detection of the match.

15. The method of claim 11, further comprising extracting the payload from the packet after identifying the end of the packet.

16. A packet network, comprising:
   an ingress entity for receiving a datagram and encapsulating the datagram with a multi-protocol label for controlling the processing of the datagram, a multi-protocol label error correction field and a cyclic redundancy check field to produce a labeled packet, and forwarding the packet to a next hop; and
   an egress entity for identifying an end of the packet encapsulating the datagram with the label, the label error correction field and the cyclic redundancy check field and for identifying the end of the packet by analyzing incoming bits for the packet until a pattern of bits is detected that matches a number of previous bits of the packet coded with a label error correction formula.

17. The packet network of claim 16 wherein the ingress entity encapsulates the datagram by adding a label and a label error correction derived using the label to the front of a datagram and adding a cyclic redundancy check derived using the datagram at a trailing end of the datagram.

18. The packet network of claim 17 wherein the label includes three bytes.

19. The packet network of claim 17 wherein the label error correction is obtained according to $D^8+D^2+D+1$.

20. The packet network of claim 17 wherein the datagram is scrambled.

21. The packet network of claim 20 wherein the datagram is scrambled according to $D^{43}+1$.

22. The packet network of claim 17 wherein the cyclic redundancy check is obtained using a polynomial $D^{16}+D^{15}+D^2+1$.

23. The packet network of claim 17 wherein the datagram is an IPv4 packet.

24. The packet network of claim 17 wherein the datagram is an IPv6 packet.

25. The packet network of claim 17 wherein the label comprises a plurality of bits, wherein a bit in the label is a label significant bit for indicating that no payload is being carried.

26. The packet network of claim 16 wherein the egress entity further codes incoming bits according to a cyclic redundancy check polynomial to produce a calculated cyclic redundancy check until the calculated cyclic redundancy check matches the cyclic redundancy check field.

27. The packet network of claim 26 wherein the selecting further comprises the identifying the end of the current packet based upon the detection of the match.

28. The packet network of claim 16 wherein the label error correction formula comprises a label error correction polynomial, the egress entity coding incoming bits according to the label error correction polynomial to produce a calculated label error correction until the label error correction matches the label error correction field.

29. The packet network of claim 28 wherein the selecting further comprises the identifying the end of the previous packet based upon the detection of the match.

30. The packet network of claim 16 wherein the label error correction formula comprises a combination of a cyclic redundancy check polynomial and a label error correction polynomial, the egress entity coding incoming bits according to the cyclic redundancy check polynomial and the label error correction polynomial, wherein the egress entity uses the cyclic redundancy check polynomial to produce a calculated cyclic redundancy check until the calculated cyclic redundancy check matches the cyclic redundancy check field and the label error correction polynomial to produce a calculated label error correction until the label error correction matches the label error correction field.

31. The packet network of claim 16, wherein the egress entity further extracts the datagram from the packet after identifying the end of the packet.

32. The packet network of claim 16, wherein the packet encapsulating the datagram is of a length unknown to the egress entity until the egress entity has identified the end of the packet.

33. The packet network of claim 16, wherein the multi-protocol label includes address information and non-address information.

* * * * *